Figure 1:
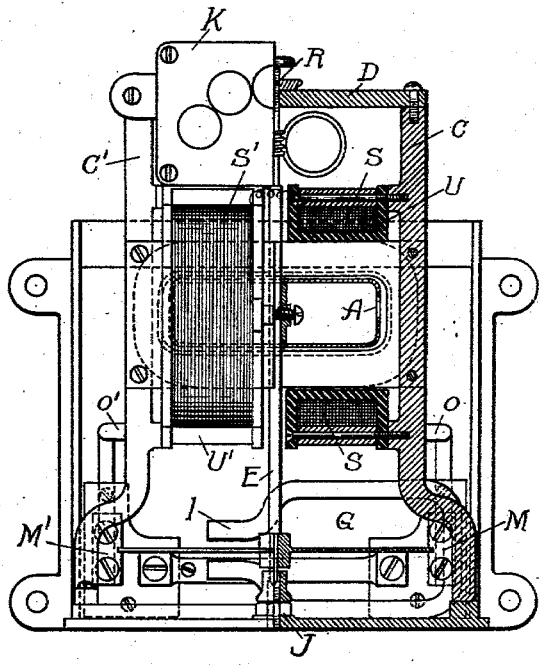

No. 715,220. Patented Dec. 2, 1902.
M. E. THOMPSON.
METHOD OF MEASURING ALTERNATING ELECTRIC CURRENTS.
(Application filed May 7, 1902.)

(No Model.) 2 Sheets—Sheet 1.

WITNESSES:

INVENTOR:
Milton E. Thompson.
by
Atty.

No. 715,220. Patented Dec. 2, 1902.
M. E. THOMPSON.
METHOD OF MEASURING ALTERNATING ELECTRIC CURRENTS.
(Application filed May 7, 1902.)
(No Model.) 2 Sheets—Sheet 2.

WITNESSES:

INVENTOR:
Milton E. Thompson.
by
Atty.

UNITED STATES PATENT OFFICE.

MILTON E. THOMPSON, OF RIDGEWAY, PENNSYLVANIA, ASSIGNOR TO GENERAL ELECTRIC COMPANY, A CORPORATION OF NEW YORK.

METHOD OF MEASURING ALTERNATING ELECTRIC CURRENTS.

SPECIFICATION forming part of Letters Patent No. 715,220, dated December 2, 1902.

Original application filed December 30, 1896, Serial No. 617,453. Divided and this application filed May 7, 1902. Serial No. 106,253. (No model.)

*To all whom it may concern:*

Be it known that I, MILTON E. THOMPSON, a citizen of the United States, residing at Ridgeway, county of Elk, State of Pennsylvania, have invented certain new and useful Improvements in Methods of Measuring Alternating Electric Currents, (Case No. 2,826, division of my prior application, Serial No. 617,453, filed December 30, 1896,) of which the following is a specification.

This invention relates to that class of electric meters for alternating electric currents in which a movable element is acted upon inductively by the influence of two or more alternating magnetic fields of different phase. In meters of this class as heretofore constructed I have found that while such meters if properly calibrated will accurately register non-inductive loads they fail to give accurate registration with loads of high inductance, and in extreme cases I have known the meter to actually run backward with loads of this latter class. I have also found that extreme changes of periodicity are liable to affect the accuracy of meters of this type, owing to the fact that such changes affect the magnetic density in the iron core of the reactance-coil used with such meters, the magnetism of such iron cores not varying in proportion to the current circulating around them.

The object of this invention is to remedy the defects above referred to and to provide an electric meter which will measure the electric energy in the work-circuit, whether that energy be consumed by devices having inductance or not—as, for example, the energy consumed by electric motors and inductance-coils as well as incandescent lamps.

In the case of the electric motors, inductance-coils, or other inductive loads the electric energy consumed will not be the product of the volts and amperes, as is the case on continuous-current circuits; but this product will represent more energy than is actually consumed, owing to the fact that the electromotive force and current-waves do not attain a maximum value at the same time, owing to what is known as a "lag" of the current-wave behind the electromotive-force wave.

When the current-wave is in unison with the impressed electromotive-force wave or, in other words, when the circuit is "resonant," the energy consumed is the greatest possible for this current and electromotive force. When the current lags ninety degrees behind the impressed electromotive force, the energy consumed is zero.

Now in a meter of the class referred to a maximum registration for a given current and electromotive force is effected when the magnetism of one set of field-coils is in exact phase with the main working current and the magnetism of the other coils lags exactly ninety degrees behind the working current or, in other words, whenever there is ninety degrees difference in phase between the magnetic fluxes induced, respectively, by the current and potential coils of the meter. A minimum or zero registration would be effected—that is, the meter would not register at all—if the main working current should lag ninety degrees, for then the two meter-fields will be coincident in phase and will not produce rotation. From this it will be seen that for correct registration of the energy of currents of various degrees of lag the difference of phase of the two magnetic fields of the meter should be the complement of the angle lag of the working current. This result always obtains if current and potential magnetic fluxes, due to the series and shunt field-coils of the meter, have a normal phase difference of ninety degrees when the circuit is resonant, with the current in phase with the electromotive force, or whenever equivalent inductive effects are maintained acting upon the rotating member of the meter. When starting with a resonant condition and maximum torque, the phase difference between the inducing magnetic fields will decrease when the current in the consumption-circuit lags, thereby decreasing the torque of the motor mechanism in the exact ratio necessary to preserve under varying angles of lag a proper registration of the true consumption of energy.

The changes in the inductive effects of the inducing fields upon the armature of the meter occasioned by current lag thus compensate for the correspondingly-changing ratio between the true consumption of energy and the so-called "apparent" energy and render the meter accurate.

The torque of the motor mechanism is always approximately proportional to the product of the current, electromotive force, and sine of the angle of current lag, and the sum of the angle of current lag in the consumption-circuit and the phase angle between the inducing current and potential magnetic fields is equal or substantially equal to ninety degrees irrespective of changes in the relative values of these two angles.

Heretofore wattmeters have been proposed comprising a current-coil and a potential coil in which the current is lagged; but the present meter differs radically in having the capability for accurate self-compensation for changes in current lag above pointed out.

Figure 3:
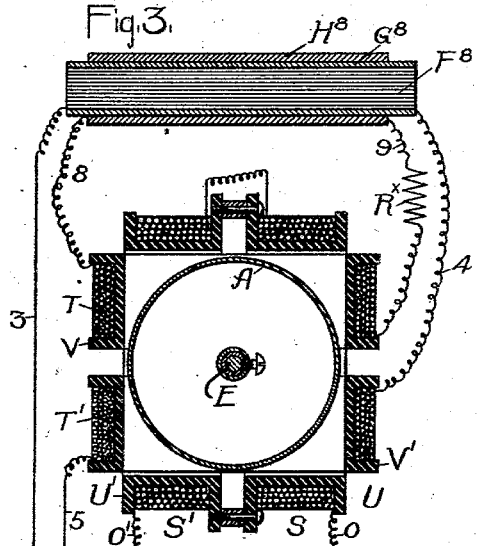
Figure 2:
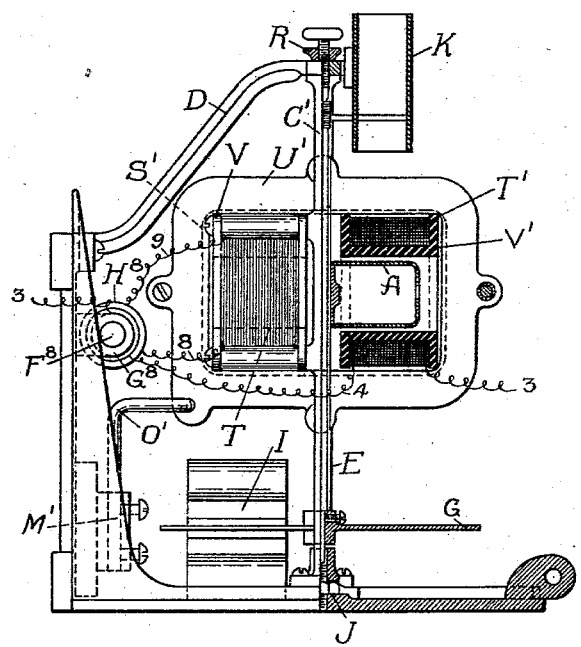
Figure 4:
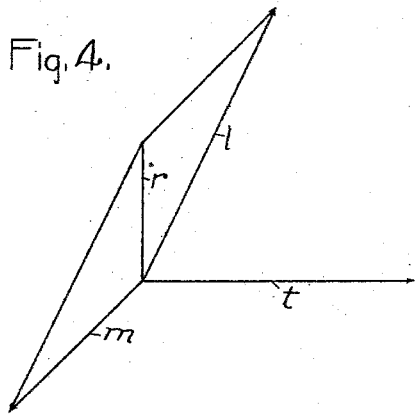

Figure 1 is a front view of a meter embodying my invention, the right-hand half thereof being shown as sectional through the center of the shaft to more clearly show the internal construction. Fig. 2 is a side view of the meter, partly sectioned, as described. Fig. 3 is a sectional and diagrammatic view of the main portion of the meter in plan view, and Fig. 4 is a diagram showing phase relations.

The structural features of the meter herein shown are arranged in a manner similar to that set forth in United States Patent No. 494,657, granted to me April 4, 1893, to which reference may be had, like parts being correspondingly lettered herein, though the present meter from an electric standpoint, and especially in those features whereby it can meter accurately inductive loads, is entirely different from that of the former patent.

Referring to Figs. 1, 2, and 3, S and S' are the series or current coils, which carry the current to be measured, said coils consisting of a comparatively few turns of heavy wire or a copper ribbon wound upon suitable spools U U', of insulating material, the coils being connected together in series, the other ends being connected by wires O' and O to binding-posts M' and M, respectively. The shunt and potential coils T and T' are arranged with their axes perpendicular to the axes of the series coils, so that there will be no induction between the series coils and the shunt-coils. The shunt-coils are wound with small wire upon suitable insulating-spools V V', these spools and the spools U U' being suitably secured to the standards C C', which latter are shown as connected at the top by a cross-head D, carrying a suitable counting-train K and an adjustable bearing R. The shaft E is supported at its upper end in said bearing and at its lower end in a step-bearing J, the shaft having secured thereto the armature A, mounted to revolve freely inside the field-coils S S' T T'. As in said patent above referred to, the armature consists of a closed metallic circuit of such shape as to embrace as many as possible of the magnetic lines produced by the field-coils.

In general the construction of the armature may be varied to meet various conditions of practice. A variety of forms in which such closed-circuit armatures may be made are now well known in the art.

I have herein shown the armature as a hollow cylinder of copper or other good conducting material, and the cylindrical part may be continuous or it may be laminated by longitudinal cuts.

Near its lower end the shaft E carries a disk G, of copper or other conducting material, revolving between the poles of the permanent magnet I in order that the armature be acted upon by a retarding force directly proportional to the speed. The strength of the magnet should be sufficient to render the speed slow relatively to that of synchronism and also slow enough to render the air-resistance inappreciable. An inductance-coil is interposed in the shunt-circuit, as best shown in Fig. 3, comprising an iron wire core $F^8$, surrounded by the primary and secondary coils $G^8$ and $H^8$, respectively. The primary coil is connected by wires 3 4 in shunt across the mains with the coil T' in series with it, the other end of said coil being connected by wire 5 to binding-post M' or to the main circuit, as clearly shown in Fig. 3. The secondary coil $H^8$ is connected in series with the shunt-coil T by wires 8 9 and with a resistance $R^\times$, which latter may conveniently be simply a portion of the coil T wound with German-silver wire. The operation of this arrangement is as follows: So far as the coil T' is concerned the primary coil $G^8$ acts simply as a choking-coil to retard the phase of the current in the circuit, and, referring to Fig. 4, if the phase of the main current passing through the series coils S S' is represented by line $t$ then the current through $G^8$ and T' will lag behind $t$ something less than ninety degrees, owing to self induction of $G^8$ and the coil T', and this lagging current may be represented by $l$. The mutual induction of coils T and T' is small as compared with that of the coils $G^8$ and $H^8$, inasmuch as the latter have an iron core, while the coils T and T' do not. The current in the coil T, passing through the secondary coil $H^8$ of the inductance-coil or transformer, will therefore lag behind the current in the coil T' something less than one hundred and eighty degrees and may be represented diagrammatically in Fig. 4 by $m$. Now completing the parallelogram of forces the resultant of $l$ and $m$ may be represented by $r$, which is shown at right angles to the line $t$. Changing the resistance $R^\times$ has the effect of changing the length of $m$, Fig. 4, and also its angle to a slight extent, and it will be at once apparent that this provides a ready method of adjusting the resultant $r$ to exactly a right angle, or ninety degrees, with $t$. In this consideration it is of course supposed that $t$ is to be from a current having no lag. The magnetism of the series coil will be in phase with $t$, as the diagram explains the action of the meter, while the magnetomotive forces due to the currents in the coils T and T', though themselves dephased by a wide angle, combine to establish a second magnetic flux proportional to the potential of the circuit which will be in phase with $r$ and of course ninety degrees behind the current flux $t$. In this way I secure a torque in the motor mechanism of the meter which is for a given current and electromotive force a maximum when the current is in phase with the electromotive force in the consumption-circuit and which will decrease when the current lags in a ratio corresponding to that in which the real energy consumed under such conditions decreases as compared with the apparent energy or product of the volts and amperes. A motor mechanism of this character in which the torque varies automatically in keeping with the phase relation between the current and electromotive force in the external circuit, as explained, in combination with the magnetic damping mechanism or any damping mechanism acting in accordance with the same law and the recording mechanism, constitute the essential features of my new meter.

In so far as the electrical actions are concerned by which torque is established by the inductive action of the out-of-phase magnetic fields upon the rotating member of the meter these are similar to the actions involved in the operation of the meter of my former patent. They are now well understood, and further explanation is unnecessary.

Owing to the retarding effect of the disk G and magnet, which is proportional to the speed of revolution, the speed of the motor is kept exactly proportional to the energy consumption, and the counting-train, recording the revolutions of the armature, thus affords a measure of the energy which is being consumed in the work-circuit.

It will be noted that the inductance-coil or transformer (shown in the drawings) is provided with a core $F^8$, consisting of a bundle of iron wire, and that the magnetic circuit of this core outside of the coils is completed through the air. The result of this "open magnetic circuit" is that its permeability, taken as a whole, is practically constant and that therefore the magnetism of the core is approximately proportional to the magnetizing-current throughout a wide range. The current flowing through the primary circuit of this inductance-coil will therefore vary in direct proportion to the impressed electromotive force and in inverse proportion to the periodicity, providing that the magnetism of the core is not allowed at any time to approach very near to saturation.

I do not limit myself to the particular form of apparatus herein shown and described, since the form of any or all of the necessary elements may be varied greatly without departing from the principle of action described, the principal features of the invention consisting not so much in the form of the elements used as in their interrelations, and all details of construction may be greatly changed from those shown and described without departing from the spirit of the invention.

I have shown a working meter embodying my improvements in the form herein set forth, because this is the form of meter in which I have heretofore embodied and tested the invention in practice.

What I claim as new, and desire to secure by Letters Patent of the United States, is—

1. The method of obtaining a magnetic field in quadrature with the impressed electromotive force, which consists in lagging a current derived from said electromotive force, producing thereby a lagging primary magnetic field, producing independently of said primary magnetic field an auxiliary magnetic field, and combining such primary and auxiliary fields to form a resultant field of the required phase relation.

2. In an electric meter, the method of obtaining a magnetic field in quadrature with the impressed electromotive force, which consists in establishing a primary magnetic field by means of a coil in a shunt-circuit in derivation to the work-circuit, and combining with said magnetic field a secondary magnetic field produced by means of a coil placed in the secondary circuit of a transformer, whose primary coil is in series with the circuit of the first-named coil.

In witness whereof I have hereunto set my hand this 1st day of May, 1902.

MILTON E. THOMPSON.

Witnesses:
E. H. BAIRD,
G. F. GREINER.